(12) United States Patent
Hsieh

(10) Patent No.: US 9,801,067 B1
(45) Date of Patent: Oct. 24, 2017

(54) DEVICE AND METHOD OF HANDLING SECURITY AUTHENTICATION

(71) Applicant: HTC Corporation, Taoyuan (TW)

(72) Inventor: Jing-Rong Hsieh, Taoyuan (TW)

(73) Assignee: HTC Corporation, Taoyuan (TW)

(*) Notice: Subject to any disclaimer, the term of this patent is extended or adjusted under 35 U.S.C. 154(b) by 0 days.

(21) Appl. No.: 15/602,125

(22) Filed: May 23, 2017

Related U.S. Application Data

(60) Provisional application No. 62/340,492, filed on May 23, 2016, provisional application No. 62/340,541, filed on May 24, 2016.

(51) Int. Cl.
| | |
|---|---|
| *H04M 1/66* | (2006.01) |
| *H04W 12/06* | (2009.01) |
| *H04W 74/08* | (2009.01) |
| *H04W 36/08* | (2009.01) |
| *H04L 5/00* | (2006.01) |
| *H04W 12/04* | (2009.01) |
| *H04W 76/04* | (2009.01) |
| *H04W 12/08* | (2009.01) |
| *H04W 84/12* | (2009.01) |

(52) U.S. Cl.
CPC .......... *H04W 12/06* (2013.01); *H04L 5/0055* (2013.01); *H04W 12/04* (2013.01); *H04W 12/08* (2013.01); *H04W 36/08* (2013.01); *H04W 74/0833* (2013.01); *H04W 76/046* (2013.01); *H04W 84/12* (2013.01)

(58) Field of Classification Search
CPC ... H04W 12/06; H04W 12/08; H04W 76/046; H04W 36/08; H04W 74/0833; H04W 12/04; H04W 84/12; H04L 5/0055
USPC ................... 455/411, 436; 370/338
See application file for complete search history.

(56) References Cited

U.S. PATENT DOCUMENTS

2015/0358864 A1* 12/2015 Park ................. H04W 36/0055
370/331

OTHER PUBLICATIONS

3GPP TS 36.331 V13.1.0 (Mar. 2016) Technical Specification 3rd Generation Partnership Project; Technical Specification Group Radio Access Network; Evolved Universal Terrestrial Radio Access (E-UTRA); Radio Resource Control (RRC); Protocol specification (Release 13).

(Continued)

*Primary Examiner* — Marcos Batista
(74) *Attorney, Agent, or Firm* — Winston Hsu

(57) ABSTRACT

A method for handling a security authentication between a communication device, a source base station (BS), a target BS and a wireless local area network (WLAN) termination (WT) comprises the source BS performing a handover with the target BS and the WT; the source BS transmitting a RRCConnectionReconfiguration to the communication device, after performing the handover; the communication device performing a random access procedure with the target BS, after receiving the RRCConnectionReconfiguration; and the target BS transmitting a confirm message to the WT after performing the random access procedure, wherein the confirm message indicates that the RRCConnectionReconfiguration is received by the communication device.

10 Claims, 7 Drawing Sheets

(56) References Cited

OTHER PUBLICATIONS

3GPP TS 36.300 V13.3.0 (Mar. 2016) Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13).

* cited by examiner

DEVICE AND METHOD OF HANDLING SECURITY AUTHENTICATION

CROSS REFERENCE TO RELATED APPLICATIONS

This application claims the benefits of U.S. Provisional Applications No. 62/340,492 filed on May 23, 2016 and No. 62/340,541 filed on May 24, 2016, which are incorporated herein by reference.

BACKGROUND OF THE INVENTION

1. Field of the Invention

The present invention relates to a device and a method used in a wireless communication system, and more particularly, to a device and a method of handling a security authentication.

2. Description of the Prior Art

A long-term evolution (LTE) system provides high data rate, low latency, packet optimization, and improved system capacity and improved coverage. The LTE system is evolved continuously to increase peak data rate and throughput by using advanced techniques, such as carrier aggregation (CA), dual connectivity, licensed-assisted access, etc. In the LTE system, a radio access network known as an evolved universal terrestrial radio access network (E-UTRAN) includes at least one evolved Node-B (eNB) for communicating with at least one user equipment (UE), and for communicating with a core network. The core network may include a mobility management and a Quality of Service (QoS) control of the at least one UE.

When LTE—wireless local area network (WLAN) Aggregation (LWA) is operated, an eNB-assisted authentication is used for helping a WLAN termination (WT) and a UE to perform a WLAN 4-way handshake authentication. However, a handover may happen, when the UE moves across a coverage boundary of en eNB. Accordingly, synchronization issue of the authentication arises. The UE needs to stop a data transmission for a long time, and starts an association procedure to update key(s) for the authentication. Throughput of the UE is reduced, and inconvenience is caused to the UE.

Thus, how to handle a security authentication when the handover occurs is an important problem to be solved.

SUMMARY OF THE INVENTION

The present invention therefore provides a communication device and method for handling a security authentication to solve the abovementioned problem.

A method for handling a security authentication between a communication device, a source base station (BS), a target BS and a wireless local area network (WLAN) termination (WT) comprises the source BS performing a handover with the target BS and the WT; the source BS transmitting a RRCConnectionReconfiguration to the communication device, after performing the handover; the communication device performing a random access procedure with the target BS, after receiving the RRCConnectionReconfiguration; and the target BS transmitting a confirm message to the WT after performing the random access procedure, wherein the confirm message indicates that the RRCConnectionReconfiguration is received by the communication device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
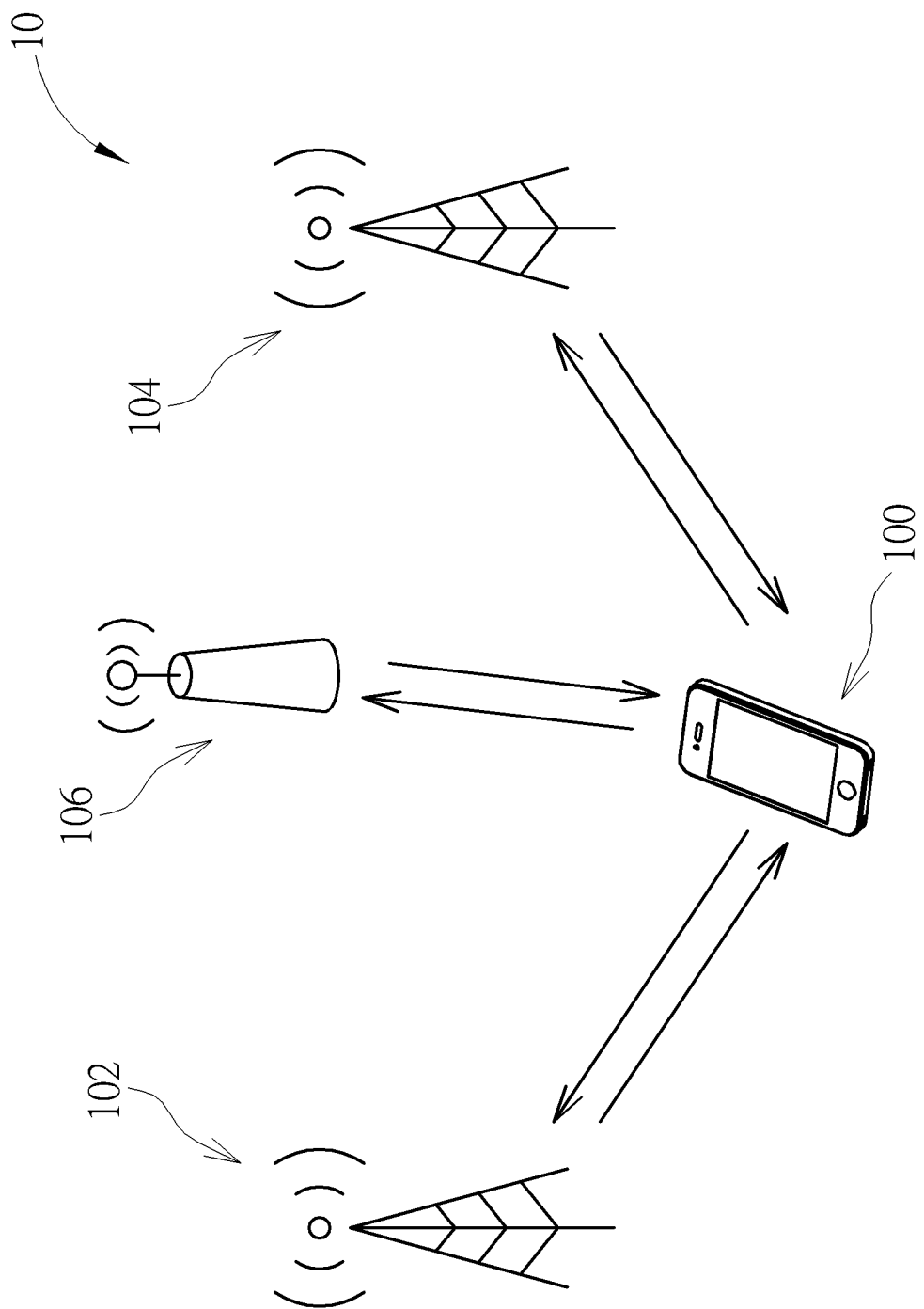
FIG. 1 is a schematic diagram of a wireless communication system according to an example of the present invention.

FIG. 1 is a schematic diagram of a wireless communication system 10 according to an example of the present invention. The wireless communication system 10 is composed of a communication device 100, base stations (BSs) 102 and 104, and a wireless local area network (WLAN) termination (WT) 106. In FIG. 1, the communication device 100, the BSs 102 and 104 and the WT 106 and are utilized for illustrating the structure of the wireless communication system 10. Practically, each of the BSs 102 and 104 may be an evolved NB (eNB) or a fifth generation (5G) (or called new radio (NR)) BS. The 5G (or NR) BS supports orthogonal frequency-division multiplexing (OFDM) and/or non-OFDM, a transmission time interval (TTI) shorter than 1 ms (e.g., 100 or 200 microseconds) and a wider system bandwidth (e.g., 200 MHz). In FIG. 1, coverage areas of the BS 102 and the BS 104 may be overlapped or non-overlapped. In general, a BS may also be used to refer any of the eNB and the 5G BS. The WT 106 may be an access point (AP) conforming to IEEE 802.1x standards.

When a LTE-WLAN Aggregation (LWA) is operated, an eNB-assisted authentication can be used for helping the WT 106 and the communication device 100 to perform a WLAN 4-way handshake authentication by using a key derived by both a BS (e.g., the BS 102) and the communication device 100 as a Pairwise Master Key (PMK). Since the PMK may need to be updated when a handover happens, the communication device 100 may need to perform an association procedure which is time-consuming with the WT 106. If the WT 106 is able to know a timing of a successful handover as well as a key updating timing at the communication device 100, the WT 106 may directly proceed to perform a 4-way handshake which can maintain the current association with an updating Pairwise Transient Key (PTK) for a following encryption on a WLAN.

The eNB-assisted authentication is defined to avoid an Extensible Authentication Protocol (EAP)/Authentication and Key Agreement (AKA) 802.1X based authentication which is usually time-consuming. A BS (e.g., the BS 102) derives a key S—$K_{WT}$ from its key $K_{eNB}$, and transmits the key S—$K_{WT}$ to the WT 106 to be used as a PMK for a later 4-way handshake authentication for a WLAN connection of the communication device 100. The communication device 100 is configured by the BS according to a configured WT counter received in a RRCConnectionReconfiguration to derive the same key S—$K_{WT}$ as PMK.

When a handover such as an intra-eNB handover or an inter-eNB handover happens, the $K_{eNB}$ is changed. The corresponding S—$K_{WT}$ needs to be updated as well. Considering a case where the WT 106 is not changed after the handover, the WT 106 gets a new configuration from a target BS (e.g., the BS 104) in a WT Addition Request and applies it if accepting it. Then, the WT 106 transmits a WT Addition Request Acknowledgement (ACK) to the target BS in response to the WT Addition Request. The WT 106 gets an updated S—$K_{WT}$ in the new configuration. However, the WT 106 does not know whether its peer (i.e., the communication device 100) also possess the same (updated) key S—$K_{WT}$ now. If the WT 106 triggers a 4-way handshake immediately, it may cause a failed 4-way handshake, and leads to a de-authentication. Accordingly, the UE needs to perform a full procedure of authentication and association. Therefore, this blind triggering of the 4-way handshake is not efficient, and causes a longer suspension time for a data transmission on the WLAN.

The communication device 100 may be a user equipment (UE), a mobile phone, a laptop, a tablet computer, an electronic book, a portable computer system, a vehicle, or an airplane. For uplink (UL), the communication device 100 is the transmitter and the BS 102, the BS 104 and/or the WT 106 is the receiver, and for downlink (DL), the BS 102, the BS 104 and/or the WT 106 is the transmitter and the communication device 100 is the receiver.

Figure 2:
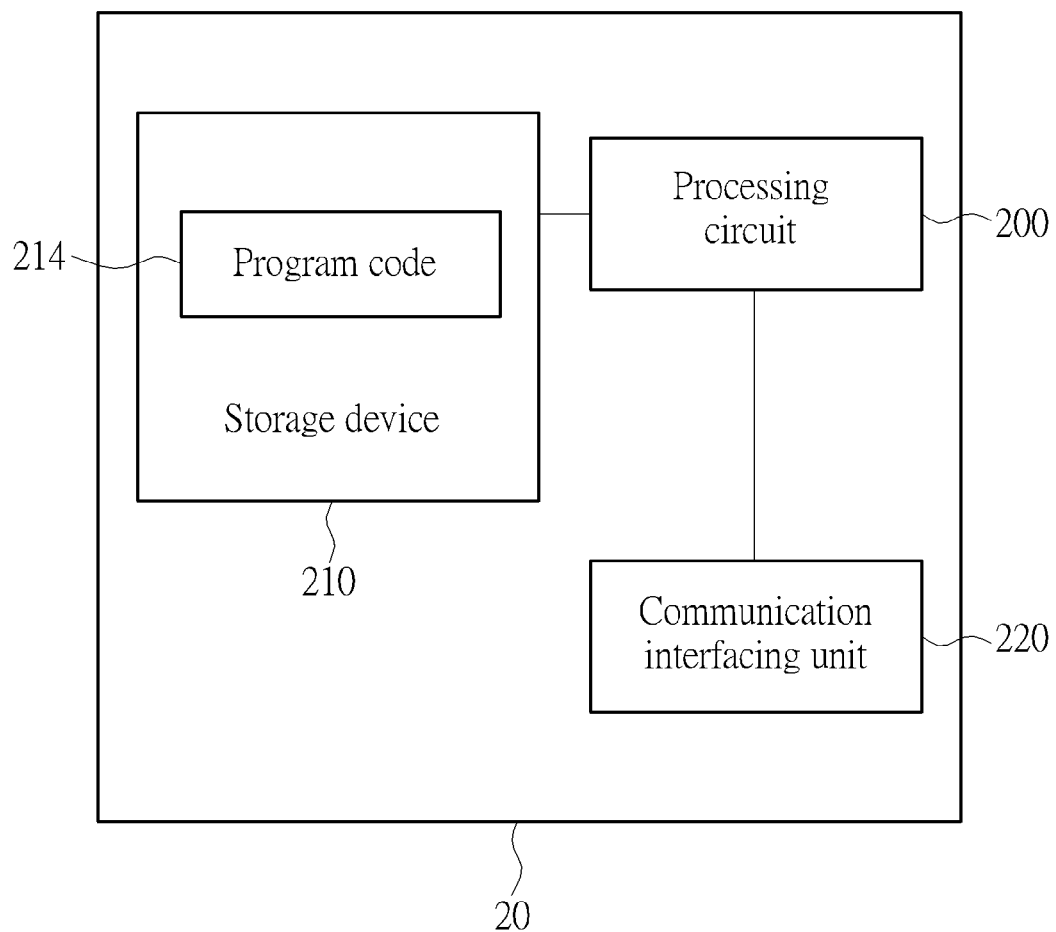
FIG. 2 is a schematic diagram of a communication device according to an example of the present invention.

FIG. 2 is a schematic diagram of a communication device 20 according to an example of the present invention. The communication device 20 may be the communication device 100, the BS 102, the BS 104 and/or the WT 106 shown in FIG. 1, but is not limited herein. The communication device 20 includes a processing circuit 200 such as a microprocessor or Application Specific Integrated Circuit, a storage device 210 and a communication interfacing unit 220. The storage device 210 may be any data storage device that stores a program code 214, accessed and executed by the processing circuit 200. Examples of the storage device 210 include but are not limited to read-only memory, flash memory, random-access memory, hard disk, optical data storage device, non-volatile storage device, non-transitory computer-readable medium (e.g., tangible media), etc. The communication interfacing unit 220 is preferably a transceiver used to transmit and receive signals (e.g., data, signals, messages and/or packets) according to processing results of the processing circuit 200.

Figure 3:
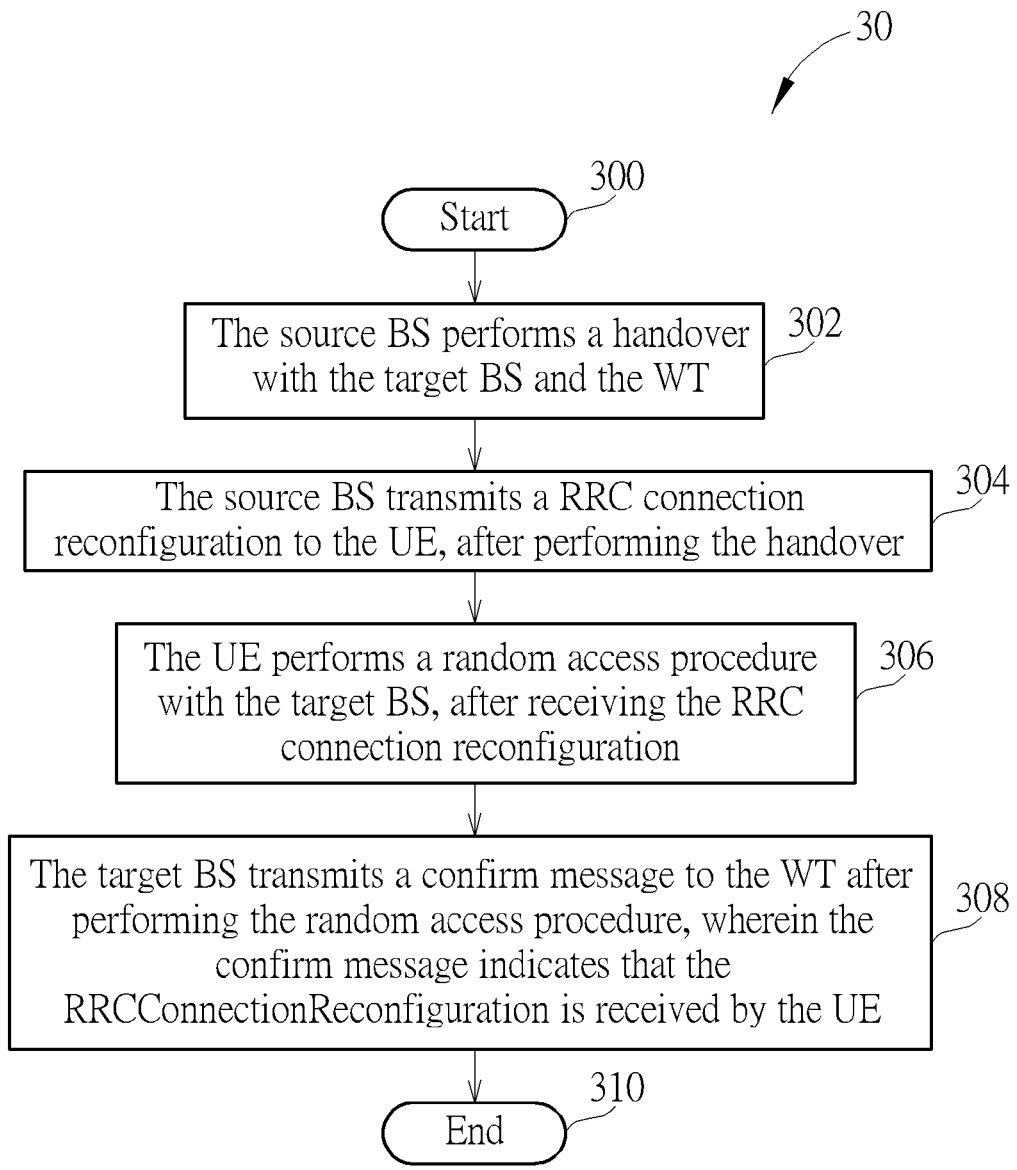
FIG. 3 is a flowchart of a process according to an example of the present invention.

FIG. 3 is a flowchart of a process 30 according to an example of the present invention. The process 30 may be used for handling a security authentication between a UE (e.g., the communication device 100), a source BS (e.g., the BS 102), a target BS (e.g., the BS 104) and a WT (e.g., the WT 106). The process 30 includes the following steps:

Step 300: Start.

Step 302: The source BS performs a handover with the target BS and the WT.

Step 304: The source BS transmits a RRCConnectionReconfiguration to the UE, after performing the handover.

Step 306: The UE performs a random access procedure with the target BS, after receiving the RRCConnectionReconfiguration.

Step 308: The target BS transmits a confirm message to the WT after performing the random access procedure, wherein the confirm message indicates that the RRCConnectionReconfiguration is received by the UE.

Step 310: End.

According to the process 30, the source BS performs a handover with the target BS and the WT, and transmits a RRCConnectionReconfiguration to the UE after performing the handover. The UE performs a random access procedure with the target BS, after receiving the RRCConnectionReconfiguration. Accordingly, the target BS transmits a confirm message to the WT after performing the random access procedure, wherein the confirm message indicates that the RRCConnectionReconfiguration is received by the UE. That is, the target BS notifies the WT (e.g., via an interface Xw) about a completion of the handover, such that the WT knows that the UE also have the an updated PMK (S—$K_{WT}$). Thus, the WT can proceed to use the updated PMK (S—$K_{WT}$) to perform a 4-way handshake to generate the PTK for a following encryption on a data transmission between the UE and the WT. This successful 4-way handshake can stop a target eNB transmitting another RRCConnectionReconfiguration message to prevent the UE from triggering a timing-consuming authentication and association procedures with the same WT.

Realization of the process 30 is not limited to the above description. An example of the channel access procedure is described as follows.

In one example, the source BS performs the handover with the target BS and the WT according to the following steps. The source BS transmits a handover request for the UE to the target BS. The target BS transmits a WT addition request (e.g., including a key S—$K_{WT}$) to the WT, after receiving the handover request. The WT accepts the key S—$K_{WT}$, and transmits a WT addition request ACK to the target BS in response to the WT addition request. The target BS transmits a handover request ACK to the source BS, after receiving the WT addition Request ACK.

In one example, the RRCConnectionReconfiguration includes mobilityControlInfo and a lwa-configuration. Thus, the UE may derive a key S—$K_{WT}$ according to a lwa-WT-counter in the lwa-configuration and a key $K_{eNB}$. The key S—$K_{WT}$ derived by the UE may be the same as the key S—$K_{WT}$ received by the WT from the target eNB.

In one example, the UE transmits a RRCConnectionReconfigurationComplete to the target BS, after performing the random access procedure. Then, the WT performs a 4-way handshake procedure with the UE, after receiving the confirm message. In one example, the target BS transmits the confirm message to the WT, after receiving the RRCConnectionReconfigurationComplete.

In one example, the UE transmits a RRCConnectionReconfigurationComplete to the target BS, after performing the random access procedure. The WT transmits a deauthentication or disasociation to the UE, after receiving the confirm message. Then, the UE performs an association procedure with the WT, after receiving the deauthentication or disasociation. In one example, the target BS transmits the confirm message to the WT, after receiving the RRCConnectionReconfigurationComplete. In one example, the WT transmits the deauthentication or disasociation with a reason code "Previous authentication no longer valid".

Figure 4:
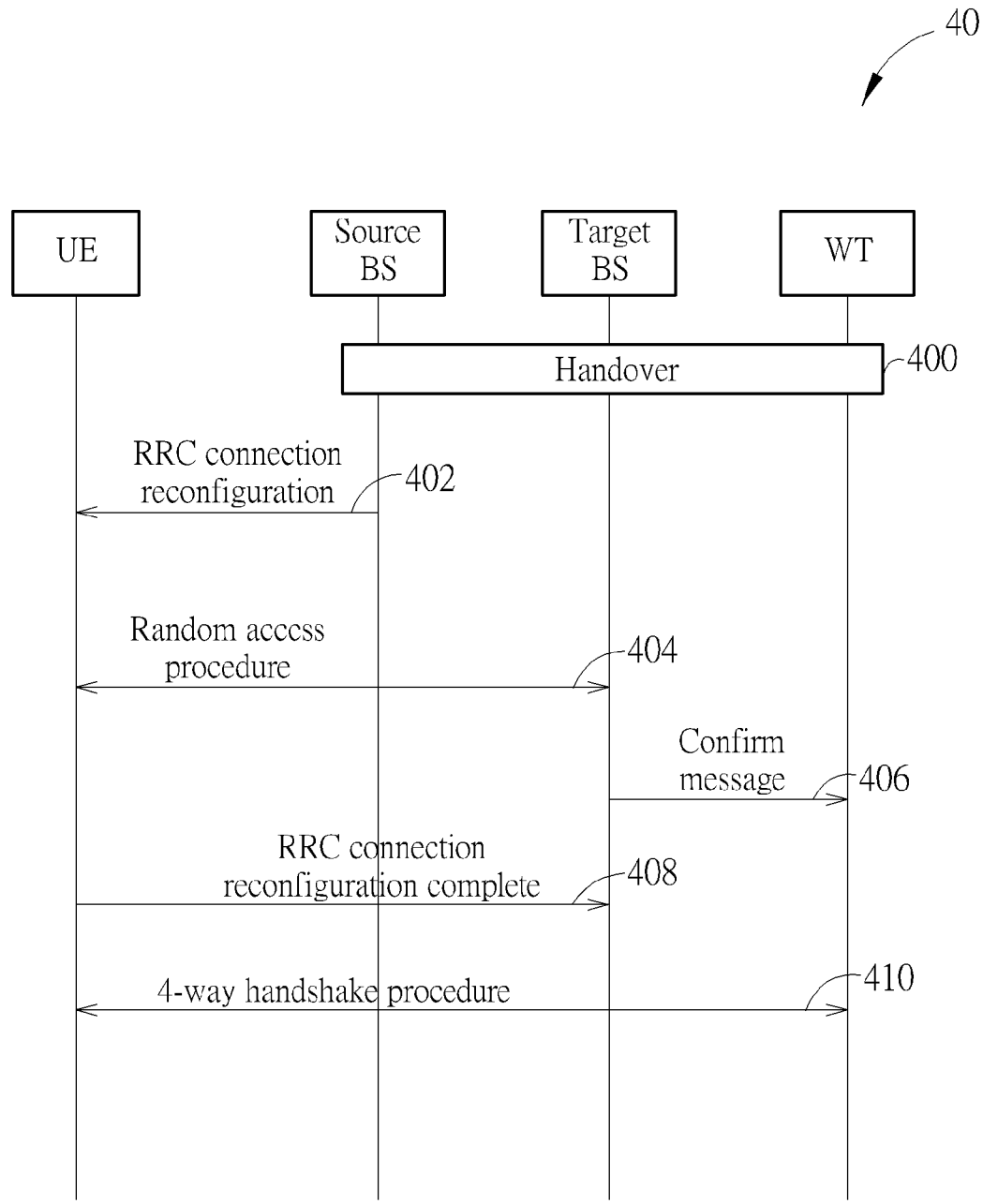
FIG. 4 is a schematic diagram of a notification procedure of a handover result according to an example of the present invention.

FIG. 4 is a schematic diagram of a notification procedure of a handover result according to an example of the present invention. Operations of a UE (e.g., the communication device 100), a source BS (e.g., the BS 102), a target BS (e.g., the BS 104) and a WT (e.g., the WT 106) in FIG. 4 are described as follows. It should be noted that the WT may or may not be configured to the UE by the source BS. The source BS performs a handover with the target BS and the WT (Step 400). Detailed operation of the handover can be referred to the previous description, and is not narrated herein. The source BS transmits a RRCConnectionReconfiguration to the UE after performing the handover (Step 402). The UE performs a random access procedure with the target BS after receiving the RRCConnectionReconfiguration (Step 404). Accordingly, the target BS transmits a confirm message to the WT after performing the random access procedure, wherein the confirm message indicates that the RRCConnectionReconfiguration is received by the UE (Step 406). Thus, the UE and the WT have the same key S—$K_{WT}$ now. In addition, the UE transmits a RRCConnectionReconfigurationComplete to the target BS, after performing the random access procedure (Step 408). More specifically, the transmission of the RRCConnectionReconfigurationComplete occurs after the transmission of the confirm message. The WT performs a 4-way handshake procedure with the UE, after receiving the confirm message (Step 410). Then, the UE and the WT have a same PTK to encrypt following data transmissions on a WLAN, after performing the 4-way handshake procedure.

Figure 5:
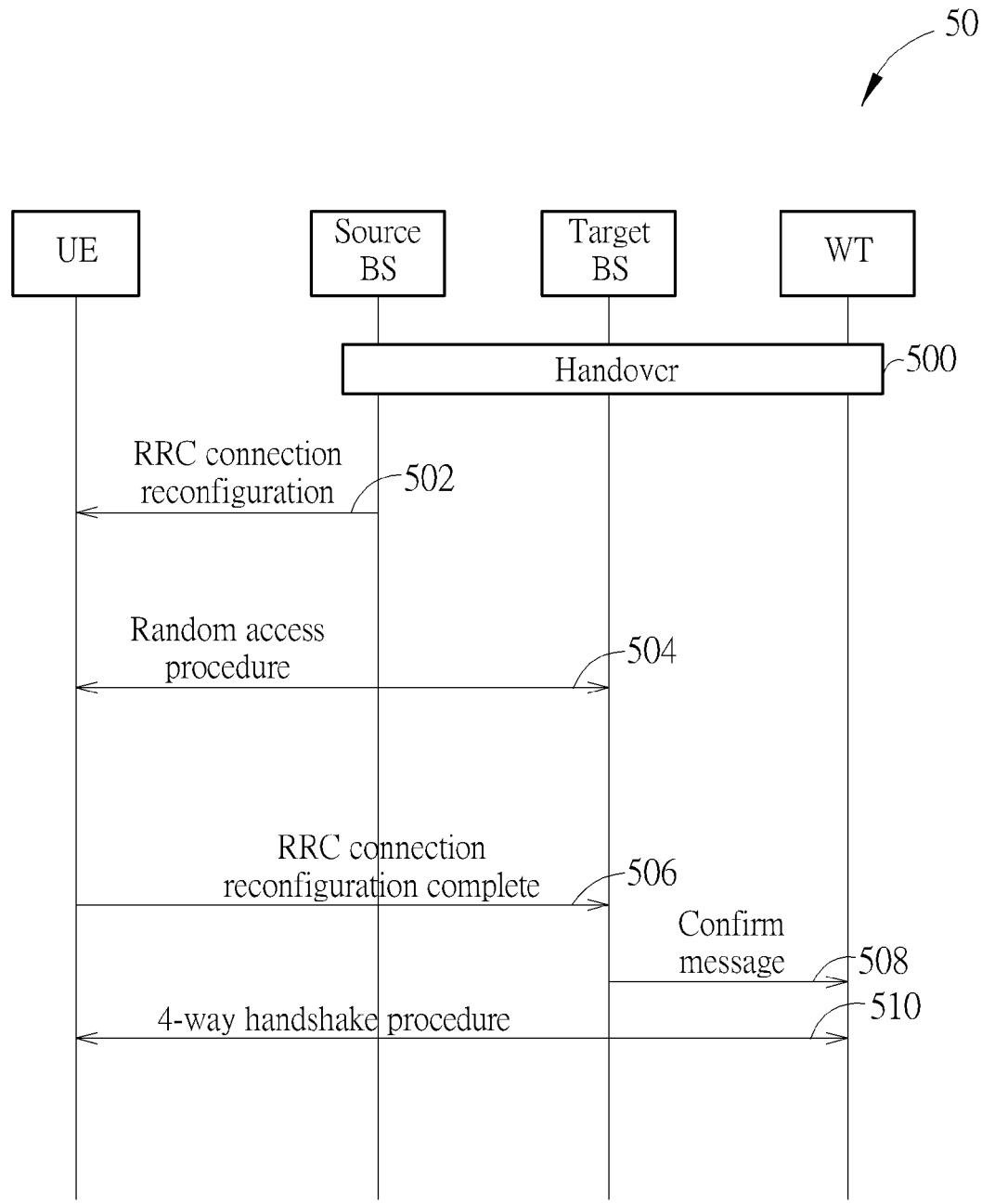
FIG. 5 is a schematic diagram of a notification procedure of a handover result according to an example of the present invention.

FIG. 5 is a schematic diagram of a notification procedure 50 of a handover result according to an example of the present invention. Operations of a UE (e.g., the communication device 100), a source BS (e.g., the BS 102), a target BS (e.g., the BS 104) and a WT (e.g., the WT 106) in FIG. 5 are described as follows. It should be noted that the WT may or may not be configured to the UE by the source BS. The source BS performs a handover with the target BS and the WT (Step 500). Detailed operation of the handover can be referred to the previous description, and is not narrated herein. The source BS transmits a RRCConnectionReconfiguration to the UE after performing the handover (Step 502). The UE performs a random access procedure with the target BS after receiving the RRCConnectionReconfiguration (Step 504). Accordingly, the UE transmits a RRCConnectionReconfigurationComplete to the target BS, after performing the random access procedure (Step 506). In addition, the target BS transmits a confirm message to the WT after receiving the RRCConnectionReconfigurationComplete, wherein the confirm message indicates that the RRCConnectionReconfiguration is received by the UE (Step 508). Thus, the UE and the WT have the same key S—$K_{WT}$ now. More specifically, the transmission of the RRCConnectionReconfigurationComplete occurs before the transmission of the confirm message. The WT performs a 4-way handshake procedure with the UE, after receiving the confirm message (Step 510). Then, the UE and the WT have a same PTK to encrypt following data transmissions on a WLAN, after performing the 4-way handshake procedure.

Figure 6:
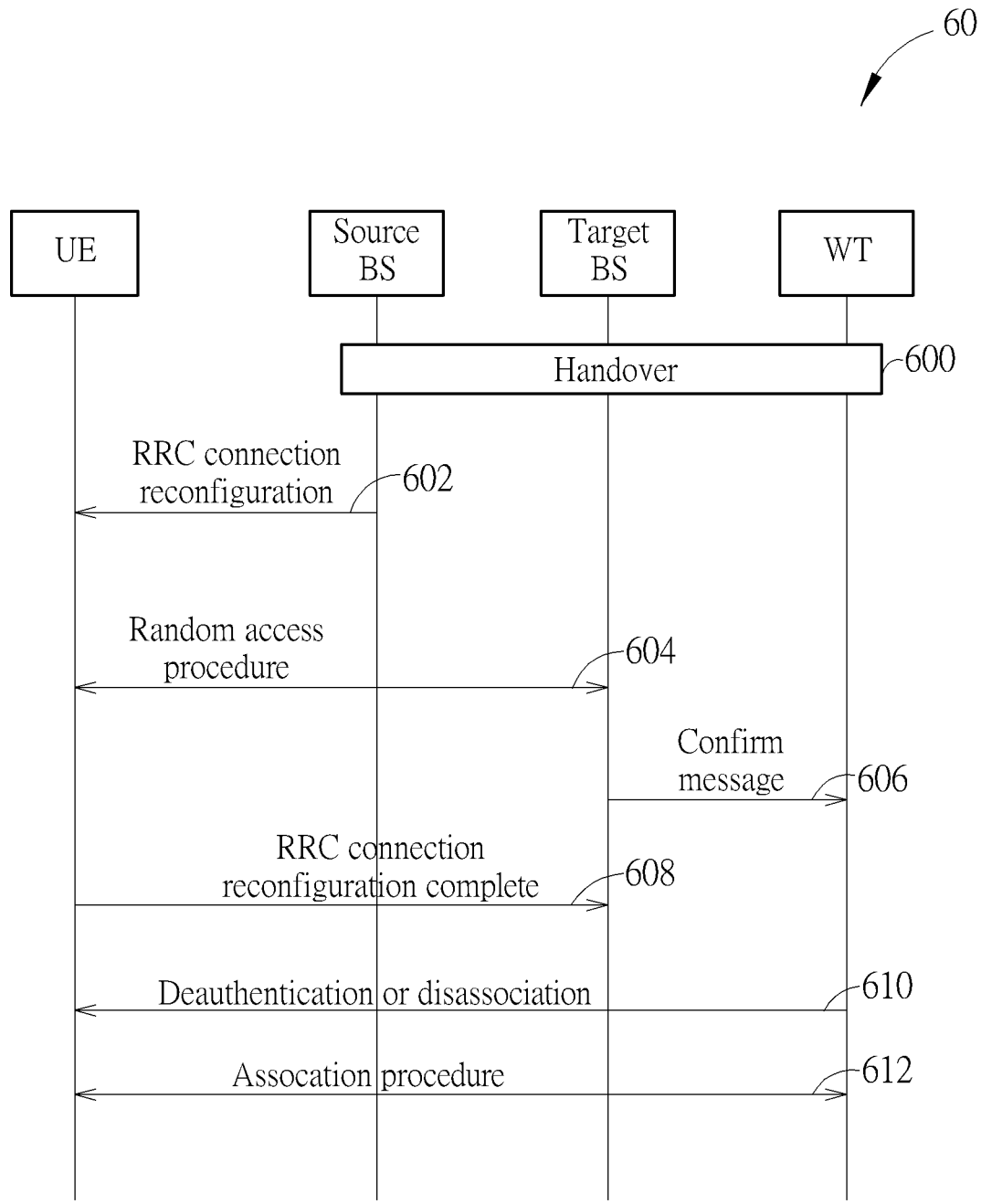
FIG. 6 is a schematic diagram of a notification procedure of a handover result according to an example of the present invention.

FIG. 6 is a schematic diagram of a notification procedure 60 of a handover result according to an example of the present invention. Operations of a UE (e.g., the communication device 100), a source BS (e.g., the BS 102), a target BS (e.g., the BS 104) and a WT (e.g., the WT 106) in FIG. 6 are described as follows. It should be noted that the WT may or may not be configured to the UE by the source BS. The source BS performs a handover with the target BS and the WT (Step 600). Detailed operation of the handover can be referred to the previous description, and is not narrated herein. The source BS transmits a RRCConnectionReconfiguration to the UE after performing the handover (Step 602). The UE performs a random access procedure with the target BS after receiving the RRCConnectionReconfiguration (Step 604). Accordingly, the target BS transmits a confirm message to the WT after performing the random access procedure, wherein the confirm message indicates that the RRCConnectionReconfiguration is received by the UE (Step 606). Thus, the UE and the WT have the same key S—$K_{WT}$ now. In addition, the UE transmits a RRCConnectionReconfigurationComplete to the target BS, after performing the random access procedure (Step 608). More specifically, the transmission of the RRCConnectionReconfigurationComplete occurs after the transmission of the confirm message. The WT transmits a message which can be a deauthentication or disasociation with a reason code such as "Previous authentication no longer valid" to the UE (Step 610). Then, the UE starts an association procedure (e.g., an open-system authentication and association process) with the WT (Step 612). Thus, the WT can perform a 4-way handshake procedure with the UE, and the UE and the WT have a same PTK to encrypt following data transmissions on a WLAN.

Figure 7:
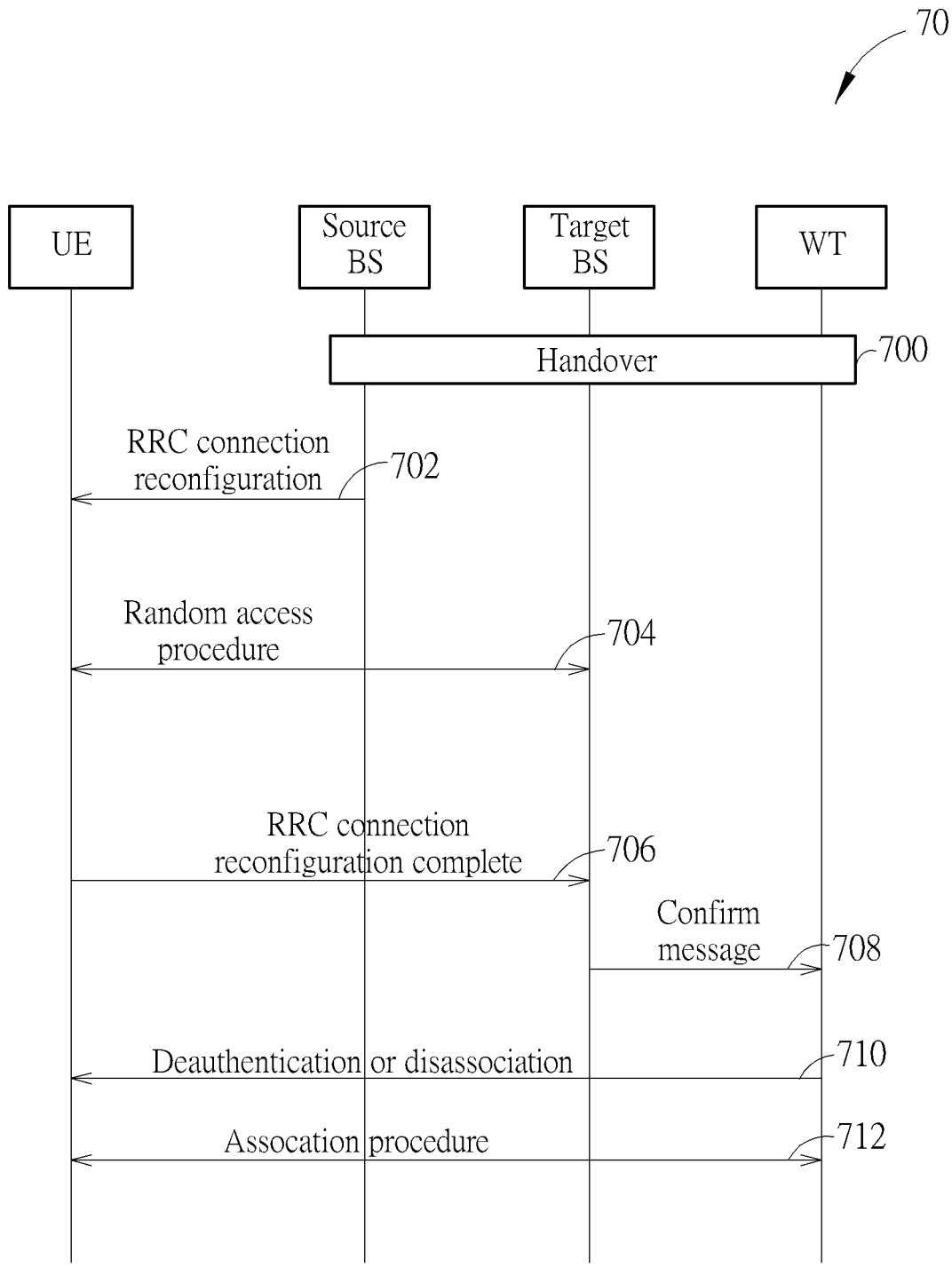
FIG. 7 is a schematic diagram of a notification procedure of a handover result according to an example of the present invention.

FIG. 7 is a schematic diagram of a notification procedure 70 of a handover result according to an example of the present invention. Operations of a UE (e.g., the communication device 100), a source BS (e.g., the BS 102), a target BS (e.g., the BS 104) and a WT (e.g., the WT 106) in FIG. 7 are described as follows. It should be noted that the WT may or may not be configured to the UE by the source BS. The source BS performs a handover with the target BS and the WT (Step 700). Detailed operation of the handover can be referred to the previous description, and is not narrated herein. The source BS transmits a RRCConnectionReconfiguration to the UE after performing the handover (Step 702). The UE performs a random access procedure with the target BS after receiving the RRCConnectionReconfiguration (Step 704). Accordingly, the UE transmits a RRCConnectionReconfigurationComplete to the target BS, after performing the random access procedure (Step 706). In addition, the target BS transmits a confirm message to the WT after receiving the RRCConnectionReconfigurationComplete, wherein the confirm message indicates that the RRCConnectionReconfiguration is received by the UE (Step 708). Thus, the UE and the WT have the same key S—$K_{WT}$ now. More specifically, the transmission of the RRCConnectionReconfigurationComplete occurs before the transmission of the confirm message. The WT transmits a message which can be a deauthentication or disasociation with a reason code such as "Previous authentication no longer valid" to the UE (Step 710). Then, the UE starts an association procedure (e.g., an open-system authentication and association process) with the WT (Step 712). Thus, the WT can perform a 4-way handshake procedure with the UE, and the UE and the WT have a same PTK to encrypt following data transmissions on a WLAN.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program code 214.

To sum up, the present invention provides a method and a communication device for handling a security authentication. One or more RRCConnectionReconfigurations from a target BS can be avoided to prevent the communication device from triggering a lengthy full authentication and association procedure with a WT. Thus, a longer suspension time for a data transmission caused by the authentication and association procedure is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for handling a security authentication between a communication device, a source base station (BS), a target BS and a wireless local area network (WLAN) termination (WT), comprising:
    the source BS performing a handover with the target BS and the WT;
    the source BS transmitting a RRCConnectionReconfiguration to the communication device, after performing the handover;
    the communication device performing a random access procedure with the target BS, after receiving the RRCConnectionReconfiguration; and
    the target BS transmitting a confirm message to the WT after performing the random access procedure, wherein the confirm message indicates that the RRCConnectionReconfiguration is received by the communication device.

2. The method of claim 1, wherein the step of the source BS performing
    the handover with the target BS and the WT comprises:
    the source BS transmitting a handover request for the communication device to the target BS;
    the target BS transmitting a WT addition request to the WT, after receiving the handover request;
    the WT transmitting a WT addition request acknowledgement (ACK) to the target BS in response to the WT addition request; and
    the target BS transmitting a handover request ACK to the source BS, after receiving the WT addition Request ACK.

3. The method of claim 2, wherein the WT addition request comprises a key S—$K_{WT}$.

4. The method of claim 1, wherein the RRCConnectionReconfiguration comprises mobilityControlInfo and a lwa-configuration.

5. The method of claim 4, further comprising:
    the communication device deriving a key S—$K_{WT}$ according to a lwa-WT-counter in the lwa-configuration and a key $K_{eNB}$.

6. The method of claim 1, further comprising:
    the communication device transmitting a RRCConnectionReconfigurationComplete to the target BS, after performing the random access procedure; and
    the WT performing a 4-way handshake procedure with the communication device, after receiving the confirm message.

7. The method of claim 6, wherein the target BS transmits the confirm message to the WT, after receiving the RRCConnectionReconfigurationComplete.

8. The method of claim 1, further comprising:
    the communication device transmitting a RRCConnectionReconfigurationComplete to the target BS, after performing the random access procedure;
    the WT transmitting a deauthentication or disasociation to the communication device, after receiving the confirm message; and
    the communication device performing an association procedure with the WT, after receiving the deauthentication or disasociation.

9. The method of claim 8, wherein the target BS transmits the confirm message to the WT, after receiving the RRCConnectionReconfigurationComplete.

10. The method of claim 8, wherein the WT transmits the deauthentication or disasociation with a reason code "Previous authentication no longer valid".

* * * * *